(12) United States Patent
Perret et al.

(10) Patent No.: US 8,330,309 B2
(45) Date of Patent: Dec. 11, 2012

(54) TUBULAR INDUCTION MOTOR WITH TWO DIRECTIONS OF ROTATION FOR HOME-AUTOMATION APPLICATIONS

(75) Inventors: Jean-Marc Perret, Passy (FR); Adrien Brondex, Domancy (FR)

(73) Assignee: Somfy SAS, Cluses (FR)

( * ) Notice: Subject to any disclaimer, the term of this patent is extended or adjusted under 35 U.S.C. 154(b) by 191 days.

(21) Appl. No.: 12/748,635

(22) Filed: Mar. 29, 2010

(65) Prior Publication Data
US 2010/0244602 A1    Sep. 30, 2010

(30) Foreign Application Priority Data

Mar. 31, 2009    (FR) ...................................... 09 01558

(51) Int. Cl.
*H02K 5/16*    (2006.01)
(52) U.S. Cl. .......................................... 310/90; 310/211
(58) Field of Classification Search .................... 310/90, 310/90.5, 211, 91; 384/279, 537
See application file for complete search history.

(56) References Cited

U.S. PATENT DOCUMENTS

| | | | |
|---|---|---|---|
| 2,462,204 A | 2/1949 | Ludwig | |
| 3,873,861 A | 3/1975 | Halm | |
| 5,068,556 A * | 11/1991 | Lykes et al. | ...................... 310/90 |
| 5,166,565 A | 11/1992 | Katsuzawa et al. | |
| 5,945,759 A | 8/1999 | Tanaka et al. | |
| 6,399,007 B1 | 6/2002 | Hanneken | |
| 6,515,385 B2 * | 2/2003 | Kuivamaki | ...................... 310/77 |
| 2008/0054747 A1 | 3/2008 | Helmi | |
| 2008/0145252 A1* | 6/2008 | Ku et al. | ......................... 418/54 |

FOREIGN PATENT DOCUMENTS

| | | |
|---|---|---|
| EP | 0 184 724 A | 6/1986 |
| EP | 0184724 A2 * | 6/1986 |
| EP | 0410 933 A | 1/1991 |
| JP | 60-091852 A | 5/1985 |

OTHER PUBLICATIONS

Search Report issued by French Patent Office for priority application FR 09 01558 dated Nov. 17, 2009.

* cited by examiner

*Primary Examiner* — Tran Nguyen
*Assistant Examiner* — Leda Pham
(74) *Attorney, Agent, or Firm* — Frommer Lawrence & Haug LLP; Ronald R Santucci

(57) ABSTRACT

Tubular induction motor with two directions of rotation contained in a tube of a tubular actuator designed to be installed in a building. The tubular induction motor includes a squirrel cage rotor supported by bearings and a stator including a stack of metal laminations forming a central bore and centered in the tube, wherein a support part of a bearing is centered in the central bore, wherein the bearing is of the plain and conductor type and wherein it is placed as close as possible to a short-circuiting ring of the rotor, preferably less than 2 mm, and preferably less than 1 mm away.

11 Claims, 2 Drawing Sheets

Fig. 1 (PRIOR ART)
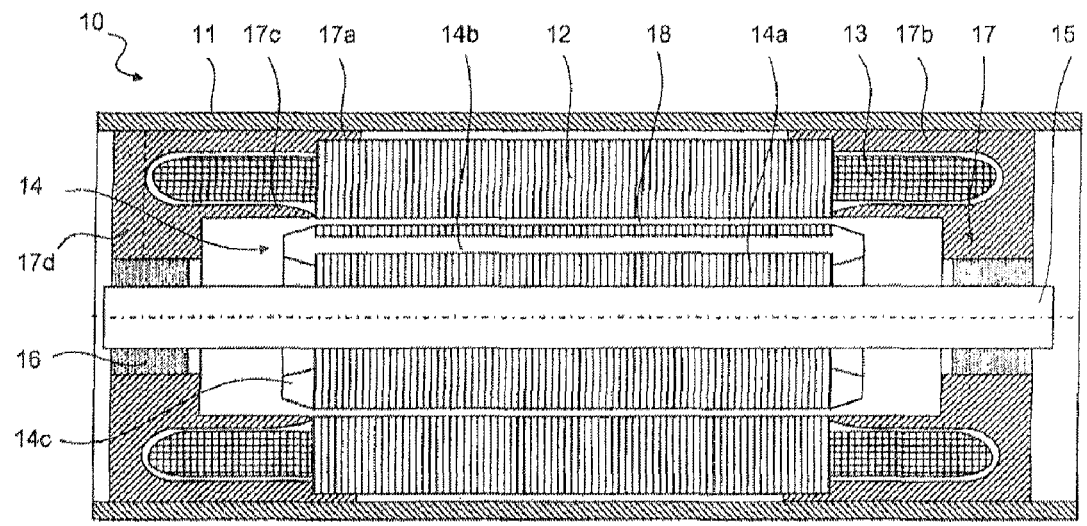
Fig. 2        Fig. 3
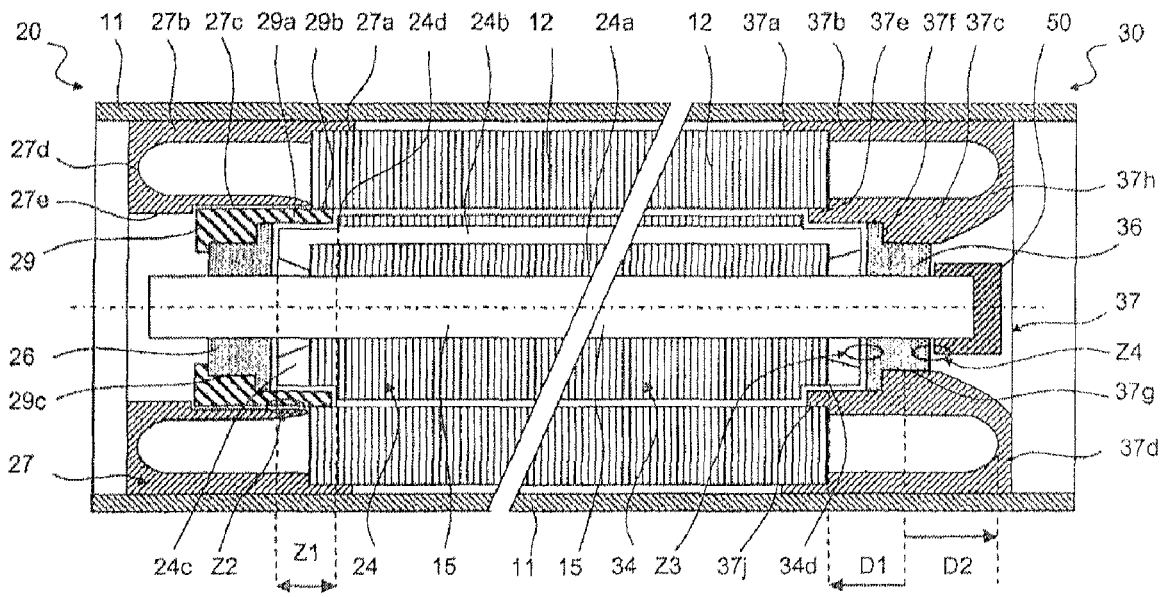

TUBULAR INDUCTION MOTOR WITH TWO DIRECTIONS OF ROTATION FOR HOME-AUTOMATION APPLICATIONS

CROSS-REFERENCE TO RELATED APPLICATIONS

This application claims priority to French Patent Application Number 09 01558 filed Mar. 31, 2009, the disclosure of which incorporated herein by reference.

BACKGROUND OF THE INVENTION

The invention relates to the field of tubular motors of the induction motor type (or asynchronous motor) with a squirrel cage rotor and two directions of rotation used in tubular actuators designed for an installation in a building.

Tubular motor means a motor inserted into an outer tube containing the tubular actuator and of which the length of the stack of stator metal laminations is usually greater than its outer diameter. The tubular actuators are installed in a horizontal position in a building, for example for winding fabrics of awnings or screens or for winding roller blinds.

The tubular motor is therefore one of the components contained in the tube of the tubular actuator. The other components are a reduction gear and usually a control unit. The result of this is that the vibrations of the motor are transmitted directly or indirectly to a long tube, of which at worst they can excite normal modes and/or of which at least they use all of the surface as a radiative surface. Particular attention must be paid to limiting or attenuating these vibrations, all the more so since the use of these actuators is mainly associated with comfort in the dwelling or with managing the luminosity or solar gains in offices, and operating silence is required in these applications.

Because the motor is simultaneously a tubular motor and a horizontal-axis motor causes problems of controlling the noise level, which are also aggravated by the specific features of an induction motor. These problems relate mainly to the various causes of eccentricity of the rotor in the stator bore. The eccentricity is all the more difficult to remove if the rotor is long and/or if the guidance of the rotor is not provided as near as possible to the stator.

In particular, a dual-pole induction motor powered at 50 Hz has a field rotating at 50 rps. Relative to the rotor, this field drives a 100 Hz pulsating force the amplitude of which is modulated to twice the sliding frequency of the rotor relative to the rotating field. This modulation also applies to all of the pulsating frequencies and particularly to the pulsations due to the passing of notches the frequency of which is equal to the product of the frequency of rotor rotation by the number of stator notches (namely close to 600 Hz for a motor with 12 stator notches rotating, with no load, at close to 50 rps).

When the motor with no load rotates for example at 48 rps, the frequency of modulation is 4 Hz. The result of this is a very low-frequency modulated noise, like a drumming, which is both disagreeable and greatly harms the perceived quality of the motor.

Economically, a shaft is guided by plain bearings (or solid bearings) rather than rolling bearings. As a result, there is a slight radial clearance of the shaft in the bearing, which aggravates the above phenomenon when it operates in the same direction as gravity. The intensity of the very low-frequency modulated noise then depends on the orientation of the motor about its horizontal axis, which also harms the perceived quality. Because the motor has two directions of rotation it requires the presence of two or three phases in order to be able to reverse the direction of the rotating field. These phases are produced with the aid of windings inserted into the stack of stator metal laminations. As a result, each end of the motor is completely taken up by the winding head, also called end winding. Each winding head is partly or most frequently completely covered by an insulating capping, designated by insulation casing or bowl. The presence of these winding heads usually separates the rotor bearings from one another. The smaller the diameter of the tubular motor, the proportionally longer the leading-out wire. Therefore, the tubular motors to which the invention relates have bowls with a length that is usually at least greater than the radius of the motor.

Patent EP 0410933 describes an induction motor with a squirrel cage rotor and of the tubular type used in the field of the invention. The rotor shaft is guided by rolling bearings at a distance from the rotor and held by end-plates centred by the outer tube.

The induction motor is also characterized by a narrow air gap. A typical value is 0.4 mm for a tubular motor with a diameter of between 40 and 60 mm. The value of this air gap is limited only by the clearance necessary for the free rotation of the rotor in the stator bore taking account of the possible geometric faults, the latter being aggravated by the considerable distance between the bearings. This value normally renders inapplicable centring solutions that can be envisaged for other types of motor, and in particular motors of which the rotor comprises permanent magnets and supporting much greater air gaps.

U.S. Pat. No. 3,873,861 describes a non-tubular, squirrel cage motor, the rotor of which is supported by two plain bearings. These bearings are themselves inserted into end-plates. One of the end-plates consists of a first casing for insulating the stator windings. The other end-plate is connected to the second casing for insulating the stator windings. The bearings are relatively close to the rotor, but the centring of the rotor shaft is carried out by means of the insulation casings. Since the motor is short, the problems mentioned above are probably not significant.

U.S. Pat. No. 5,166,565 describes a similar principle of guidance by means of the casings for insulating the stator windings, this time performed by rolling bearings.

In the case of the motor described in U.S. Pat. No. 6,515,385, guidance is provided by rolling bearings very far from the squirrel cage rotor.

By contrast, U.S. Pat. No. 6,399,007 describes a non-tubular, hidden-pole induction-motor structure with a short rotor, for which the rotor is guided by plain bearings that can be kept very close to the rotor (FIG. 6). This configuration is made possible by the structure of the winding (not shown) around the inner portion of the stator in these particular motors with a single direction of rotation. The bearings have a much smaller diameter than the stator diameter.

With the exception of U.S. Pat. No. 6,399,007, which relates to a non-reversible motor type, all the above motors have bearings or rolling bearings held by supports that are mainly connected to the outer tube or mainly connected to the electrical insulation means of the windings. On the matter of vibration, the radial micro-movements of the bearings are, in a first case, directly transmitted to the outer tube. In the second case, these micro-movements are constrained little or not at all and can have a significant amplitude.

There is therefore, for tubular actuators of buildings, a need to produce a low-cost tubular motor of the induction type with a squirrel cage rotor making it possible to ensure good accuracy of alignment of the rotor and the stator and a very low excitation of the actuator tube by the vibrations transmitted to the bearings supporting the rotor.

U.S. Pat. No. 5,945,759 and U.S. Pat. No. 2,462,204 disclose a motor including a stator comprising metal laminations forming a central bore and a support part of a bearing centred in the central bore.

BRIEF SUMMARY OF THE INVENTION

The object of the invention is to provide a motor remedying the above drawbacks and improving the motors known from the prior art. In particular, the invention makes it possible to produce simply and economically an induction-type motor with a squirrel cage rotor while ensuring good accuracy of alignment of the rotor and the stator and very low excitation of the tubular actuator tube containing the motor by the vibrations transmitted to the bearings supporting the rotor. Moreover, the invention allows improving operation of the motor, in particular to improve its mechanical efficiency, in an environment of low temperatures. Furthermore, the invention allows limiting the axial movements of the rotor regarding the stator.

According to the invention, a tubular induction motor with two directions of rotation, contained in a tube of a tubular actuator, is designed to be installed in a building. It comprises a squirrel cage rotor supported by bearings and a stator comprising a stack of metal laminations forming a central bore and centred in the tube. A support part of a bearing is centred in the central bore. The bearing is of the plain and conductor type and is placed as close as possible to a short-circuiting ring of the rotor, preferably less than 2 mm and preferably less than 1 mm away.

The support part may comprise a bearing surface for centring the bearing and a bearing surface for centring in the central bore.

The bearing surface for centring in the central bore may comprise a shoulder and/or the central bore may comprise a shouldered bearing surface.

The support part may be a sleeve having the sole function of centring the bearing relative to the central bore, the sleeve if necessary being locked by a casing covering winding end winding of the stator.

The support part may be a casing covering winding end winding of the stator, the latter comprising a tubular extension of an inner web.

The inner web may be connected to the rest of the casing via an articulation.

The bearing may be of the plain type and/or may be placed as close as possible to a short-circuiting ring of the rotor, preferably less than 2 mm and preferably less than 1 mm away.

The distance from the centre of the bearing to the stator may be less than the distance from the centre of the bearing to a radial web of the casing.

The rotor may comprise, at each of the ends of the stack of metal laminations forming it, a portion of reduced diameter.

The radius of a portion of bearing facing the rotor may be at least greater than the radius of a short-circuiting ring of the rotor.

A universal joint may be placed on a shaft of the rotor, the bearing being placed between the rotor and the universal joint, and there may be a first reduced clearance between the rotor and the bearing and a second reduced clearance between the universal joint and the bearing, the first clearance preferably being less than 2 mm and preferably less than 1 mm and the second clearance preferably being less than 2 mm and preferably less than 1 mm.

The length of the stack of metal laminations forming the stator may be greater than the length of the stack of metal laminations forming the rotor.

BRIEF DESCRIPTION OF THE DRAWINGS

The invention will be better understood on reading the following description given only as an example and made with reference to the appended drawings in which:

FIG. 1 represents a tubular motor according to the prior art.

FIG. 2 represents a first embodiment of the invention.

FIG. 3 represents a second embodiment of the invention.

DETAILED DESCRIPTION OF THE INVENTION

Figure 4:
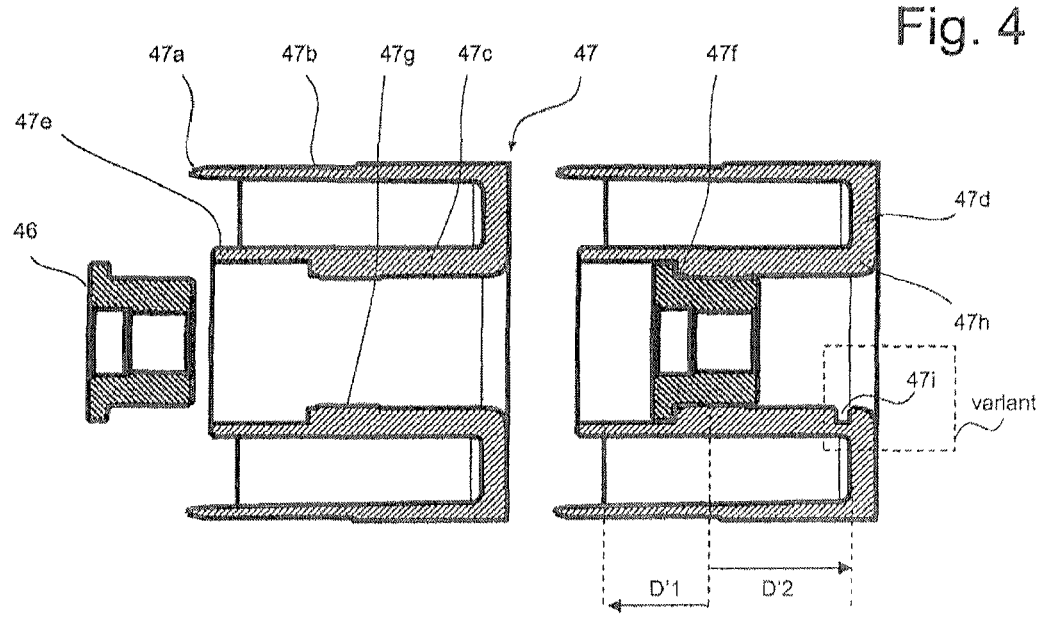
FIG. 4 represents a bearing and insulation casing assembly according to the second embodiment.

FIG. 1 represents, in longitudinal section, a tubular motor 10 according to the prior art. The tubular motor is inserted in an outer tube 11, extending on either side of the motor and represented in a truncated manner. The outer tube 11 is the tube of a tubular actuator designed to be installed in a building and comprising at least one mechanical reduction gear, not shown. The motor comprises a stack of stator metal laminations 12 comprising notches, not visible in this section, into which enameled copper wire windings are inserted. Outside the stator, the turns of the coils pass from one notch to a notch almost diametrically opposite, forming winding heads 13 or end windings. Depending on the type of winding method used, "flyer" winding or traditional insertion winding, the winding heads are more or less voluminous. The motor comprises a rotor 14 attached to a shaft 15. The rotor comprises a stack of rotor metal laminations 14a, these metal laminations usually originating from the same cutting method as the stator metal laminations. The rotor metal laminations are also furnished with notches or openings and the stacking of the rotor metal laminations creates longitudinal cavities 14b, filled with aluminium (an aluminium alloy) during an overmoulding operation and thus forming aluminium conductors. On either side of the rotor, a short-circuiting ring 14c obtained during the same overmoulding operation, makes it possible to connect all the aluminium conductors of the notches or openings of the rotor. In the figure, the rotor comprises an odd number of openings, for example fifteen openings which explains that a single longitudinal cavity can be seen in section. A bearing 16 supports the shaft 15 at each end, this bearing being itself housed in an insulation casing 17 making it possible to cover the winding heads. The insulation casing comprises in particular strips 17a allowing both the coupling of the insulation casing to the stack of stator metal laminations and the centring of the latter in the outer tube, an outer cylindrical web (or a wall) 17b, an inner cylindrical web (or a wall) 17c and a radial web (or a wall) 17d. The thickness of the radial web (the limit of which is schematized by a dashed line) is large enough to ensure a centring of the bearing in the outer tube.

Thus the outer tube is used as a common reference for the centring of the stack of stator metal laminations and for the centring of the rotor. An air gap 18, which is desired to be as even as possible, separates the rotor and the stack of stator metal laminations. The width of the air gap is typically 0.4 mm.

For a "diameter 40" tubular actuator, designed to be inserted into the interior of a 40 mm winding tube (internal diameter 37 mm), the external and internal diameters of the outer tube are respectively 36 and 34 mm, the stack of stator metal laminations has an external diameter of 33 mm, while the rotor of certain models has a length greater than 50 or even 70 mm. The end winding extends typically 20 mm in the axial direction, that is more than one and a half times the radius of the stator.

In the following figures, the parts that are unchanged relative to FIG. 1 retain one and the same reference number. The parts that are modified but have a generally identical function retain the same unit number with a tens number specific to each figure.

FIG. 2 represents in section a tubular motor 20 according to a first embodiment of the invention. The stack of stator metal laminations 12 is not modified. The winding heads are not shown, for greater clarity. A rotor 24 comprises a stack of rotor metal laminations 24a and rotor notches 24b overmoulded in aluminium, the stack of rotor metal laminations and/or the notches and/or the overmouldings being modified in the vicinity of each end of the rotor, in a zone Z1 indicated by its line on the rotor shaft, by the creation of a gap 24d or a shouldered diameter. The short-circuiting ring 24c is similarly modified by the gap 24d. These modifications are shown in detail in FIGS. 6 and 7.

The gap 24d makes it possible to free up an additional air-gap space, strictly limited to the end of the stack of stator metal laminations.

The function of an insulation casing 27 is to centre the stack of stator metal laminations in the outer tube and to cover the winding head so as to insulate it at least from the outer tube. It comprises several centring lugs 27a extending from an outer cylindrical web 27b, an inner cylindrical web 27c, and a radial web 27d. In this embodiment, the radial web does not support a bearing. Specifically, a sleeve 29 is inserted, preferably by tight sleeve-fitting, via its tubular extension 29a, into the stack of stator metal laminations 12 taking advantage of the air-gap space released by the gap 24d. A first bearing surface for centring corresponding to this sleeve-fitting is indicated by reference number 29b. This sleeve is used as a housing for a bearing 26, on a second bearing surface for centring 29c. The sleeve is as rigid as possible at its tubular extension. Since the thickness of the latter is limited, the length of this tubular extension is taken to be as small as possible. In other words, the bearing is placed as close as possible to the rotor.

Preferably, the bearing is a solid bearing, for example made of sintered bronze, self-lubricated. Advantageously it comprises a shoulder allowing it to stop in the sleeve 29. Preferably the external diameter of the bearing (or of its shoulder) is at least equal to the external diameter of the short-circuiting ring.

The clearance between bearing and short-circuiting ring is as small as possible. It is for instance less than 3 mm. Preferably, it is less than 2 mm or less than 1 mm.

It may seem surprising to place a (electrical) conducting bearing so close to an induction motor stator, while giving it a dimension close to the diameter of the rotor, that is to say likely to be greatly subjected to the end magnetic field of the stator. Those skilled in the art may fear the appearance of eddy-currents induced into the bearing, causing a considerable heating of the latter. There are indeed induced currents, but they are much weaker than expected. For this the closeness of the short-circuiting ring may provide an explanation, since the currents induced into the latter actually oppose the variations of magnetic field. The bearing would thus benefit from protection of the shielding type, provided by the short-circuiting ring. The shielding is indeed imperfect, but the residual heating of the bearing in contrast becomes an advantage because, in cold weather, it makes it possible to immediately fluidify the lubricant contained in the pores of the bearing. The mechanical efficiency of the motor is thus improved. This arrangement is therefore particularly advantageous. The bearing also makes it possible to prevent any axial movement of the rotor, particularly during handling of the actuator when it is installed on site. There is therefore contact between the short-circuiting ring and the bearing. During a rotation, the sliding of the short-circuiting ring on the bearing is no disadvantage in terms of friction or wear. Since the motor has a horizontal axis, the lateral load on this bearing is negligible. The magnetic field tends to centre the rotor in the stator.

Preferably, the sleeve 29 slides freely in the insulation casing 27. The clearance may be as small as possible, provided that the dimensional relation that will be described in the case of FIG. 3 is satisfied. The radial vibrations of the bearing are transmitted via the sleeve essentially to the stator and not directly to the outer tube. This therefore provides the benefit of the weight effect of the stator to reduce these vibrations as much as possible.

Alternatively, for larger dimensions of tubular motor, the stiffness of the tubular extension 29a of the sleeve may be reduced and adjusted to obtain a second order filtering for the frequencies situated beyond the natural frequency of the system formed by this stiffness and by the half-weight of the rotor. In the dimensions described above, the natural frequency is in the range of 12 KHz, so greater than most of the frequencies to be filtered. It is therefore worthwhile, in contrast, to take the greatest possible stiffness.

The sleeve can without any trouble be immobilized axially, for example with the aid of an adhesive seal between the sleeve and the insulation cover in the zone indicated by reference Z2. The immobilization can be provided by any other means for locking the sleeve in the insulation casing, for example with the aid of a shoulder 27e. This immobilization holds the rotor, including during vertical handling of the motor or in the event of an impact. Immobilization by bonding does not penalize the fact that the radial vibrations are transmitted mostly to the bore of the stack of stator metal laminations, the propagation path to the outer tube being penalized by the adhesive seal, the length of the horizontal cylindrical web 27c and the articulation between the latter and the radial web 27d.

For greater clarity, the first bearing surface for centring 29b between the tubular extension 29a of the sleeve and the central bore 12a of the stator 12 has been shown enlarged in the lower portion of FIG. 2.

FIG. 3 shows in section a tubular motor according to a second embodiment of the invention. This second embodiment differs mainly from the first embodiment in that the sleeve is replaced by a particular shape of an insulation casing 37, or bowl.

The insulation casing 37 comprises several centring lugs 37a in the extension of an outer cylindrical web 37b, an inner cylindrical web 37c, and a radial web 37d. A tubular extension 37e of the inner cylindrical web is inserted, preferably by tight sleeve-fitting, into the stack of stator metal laminations 12 taking advantage of the air-gap space released by a gap 34d made in the rotor 34 in the same manner as the gap 24d of the rotor 24. A first bearing surface for centring 37j on the central bore of the stator is thus defined. The inner cylindrical web is used as a housing for a bearing 36, on a second bearing surface for centring 37g. It is as rigid as possible at its tubular extension. The bearing is placed as close as possible to the rotor. The zone Z3 represents the existence of a reduced operating clearance between the bearing and the short-circuiting ring of the rotor.

For greater clarity, the first bearing surface for centring 37j between the tubular extension 37e of the casing and the central bore 12a of the stator 12 has been shown enlarged in the lower portion of FIG. 3.

The distance D1 taken between the average position of the bearing and the stack of stator metal laminations is therefore preferably shorter than the distance D2 taken between the average position of the bearing and the radial web. As will be seen in FIG. 4, additional precautions may be taken in order to ensure, as in the previous case, that the radial vibrations of the bearing are transmitted mostly to the bore of the stack of stator metal laminations, for example by making use of an articulation 37h connecting the inner web and the radial web.

Also represented in FIG. 3 is a portion of a universal joint 50 making it possible to connect the shaft of the motor to the shaft of the reduction gear (not shown) situated in line with the motor in the tubular actuator. The rotor, the bearing and the universal joint are placed so that there is a first reduced clearance Z3 between the rotor and the bearing and a second reduced clearance Z4 between the universal joint and the bearing. The first clearance is preferably less than 2 mm and preferably less than 1 mm and the second clearance is preferably less than 2 mm and preferably less than 1 mm.

FIG. 4 represents in section a bearing and insulation casing assembly according to the second embodiment, before and after the bearing 46 is assembled into the insulation casing 47. Compared with FIG. 3, the reference numbers are modified by a ten only because of a slightly different geometry of the parts. In particular, the casing comprises a reinforcement 47g allowing the tight mounting of the bearing, and a shoulder 47f allowing the stopping of the bearing when it is mounted. The distance D'1 between the average position of the bearing and the stack of stator metal laminations (the end of the outer web) is taken to be shorter than the distance D'2 between the average position of the bearing and the radial web 47d. The connection to the radial web forms an articulation 47h, the flexibility of which is advantageously increased by the addition of a groove 47i in the case of a variant articulation shown in a rectangle in dashed lines.

The articulation, and more so if it is furnished with the groove 47i, makes it possible to filter radial vibrations travelling towards the radial web 47d.

Figure 5:
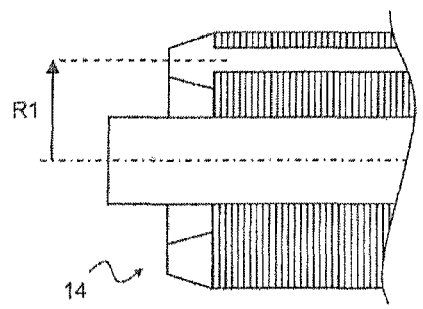
FIG. 5 represents one end of a rotor according to the prior art.

FIG. 5 represents, in enlarged section, one end of a rotor 14 according to the prior art. R1 indicates the average radius of the rotor notches. This average radius is equal to the average radius of the short-circuiting ring.

The invention can apply to a motor of which the stack of stator metal laminations has a stator length LS and of which the rotor is made according to the prior art, but with a stack of metal laminations with a rotor length LR such that:

$$LR=LS-2\times D3$$

where D3 represents a distance slightly greater than the length of the tubular extension 29a, 37e or 47e. Therefore, no machining of the rotor is necessary.

Conversely, for a standard rotor to be retained, the length of the stack of stator metal laminations is increased by twice the distance D3.

Figure 6:
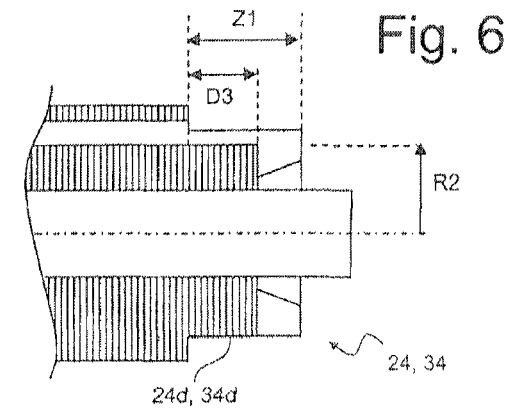
FIG. 6 represents one end of a rotor according to the invention.

FIG. 6 represents, in enlarged section, one end of a rotor 24 or 34 machined according to the invention. This rotor is for example made by machining on a lathe of a rotor according to the prior art so as to create the gap 24d or 34d. The machining is carried out on the short-circuiting ring and on a length D3 of the stack of rotor metal laminations.

By doing this, the average radius of the short-circuiting ring R2 is smaller than the average radius R1 of the rotor notches.

Because of the partial machining of the rotor over the distance D3 and at the short-circuiting ring, the rotor resistance increases. Similarly, since the air gap 18 increases locally in the vicinity of the recessed zones, there is a slight reduction in performance of the motor. This reduction is offset if necessary by an increase in the length of the stacks of stator and rotor metal laminations for a given nominal power, before modification.

If a performance reduction is noted despite an increase in the length of the rotor and of the stator equal to the sum of the recessed lengths, it is then possible to use a variant embodiment of the rotor.

Figure 7:
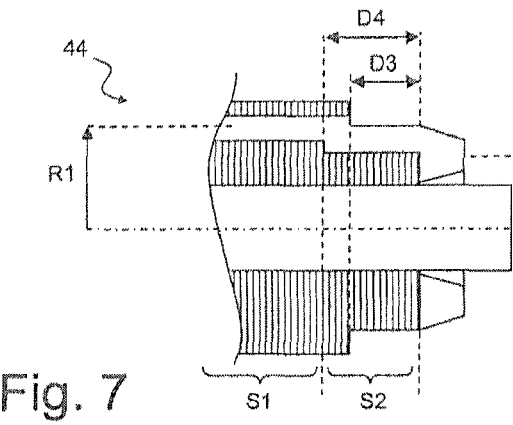
FIG. 7 represents a variant end of a rotor according to the invention.

FIG. 7 represents, in enlarged section, a variant of an end of a rotor according to the invention. For the manufacture of this rotor, a first type of metal lamination S1, identical to the rotor metal laminations of the prior art, is used and then, in the vicinity of the end of the rotor and over a distance D4, a second type of metal lamination S2 is used. The length D4 of the second stack of rotor metal laminations is greater than the length D3 recessed during the machining operation following the injection of aluminium. The rotor metal laminations of the second type have larger notches in their radial direction to the centre than the metal laminations of the first type. Because of this, there is no reduction in the average section of the overmoulded notches, even after machining, compared with the prior art. According to this variant, the short-circuiting ring has an average radius R3 that is markedly smaller than the average radius of the rotor notches (in the central portion of the latter).

The variant shown in FIG. 7 can also be obtained by the use, for the manufacture of this rotor, of a first type of metal lamination S1, identical to the rotor metal laminations of the prior art, then, in the vicinity of the end of the rotor and over a distance D4, a second type of metal lamination S2 is used. The length D4 of the second stack of rotor metal laminations is greater than the length of the shouldered diameter D3. The rotor metal laminations of the second type have external diameters that are smaller than the metal laminations of the first type and notches opening to the outside of the metal laminations and extending further in the radial direction towards the centre than the metal laminations of the first type. Because of this, there is no reduction in the average section of the overmoulded notches. The rotor can therefore be finished after the aluminium overmoulding operation without requiring machining. According to this variant, the short-circuiting ring has an average radius R3 that is markedly smaller than the average radius of the rotor notches (in the central portion of the latter).

Figure 8:
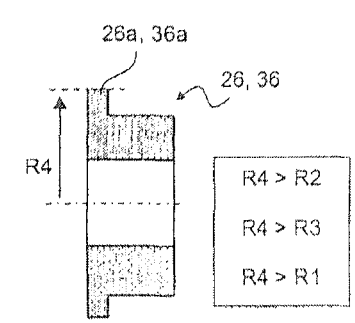
FIG. 8 represents a dimensional relation on a bearing of the motor according to the invention.

FIG. 8 shows a dimensional relation on a bearing of the motor 26 or 36 according to the invention.

It is advantageous that the external radius R4 of the bearing, taken at its collar 26a or 36a if it has one, is greater than the average radius R3 or R2 of the short-circuiting ring.

If using a rotor according to the prior art used with a longer stator, the relation is written:

$$R4>R1.$$

In another embodiment of the motor according to the invention, to manufacture the rotor, a first type of metal lamination S3, identical to the metal laminations of the stator of the prior art, is used and then, in the vicinity of the ends of the stator and over a defined distance, a second type of metal lamination S4 is used. The stator metal laminations of the second type have a larger internal diameter than the metal laminations of the first type. Because of this, the stacks of stator metal laminations at the ends of the stator define shouldered bores in which it is possible to sleeve-fit a sleeve or casing bearing surface. It is therefore possible to use a rotor according to the prior art.

By virtue of the motor structure according to the invention, the mass of the stator is used to constrain the micro-movements of the bearings supporting the rotor. This result is obtained by the use of a bearing support part (a sleeve or an insulation casing) designed in a single block and directly centred in the stator bore, at the ends of the stack of stator metal laminations.

The invention claimed is:

1. Tubular induction motor (20; 30) with two directions of rotation, contained in a tube (11) of a tubular actuator designed to be installed horizontally in a building and adapted for maneuvering a mobile home-automation element, comprising a squirrel cage rotor (24; 34) supported by bearings (26; 36; 46) and a stator (12) comprising a stack of metal laminations forming a central bore (12*a*) and centered in the tube, wherein support parts of the bearings (29; 37; 47) are centered in the central bore, wherein the bearings are of the plain and conductor type and wherein they are each placed less than 2 mm away from short-circuiting rings (24*c*) of the rotor.

2. Motor according to claim 1, wherein the support parts comprise bearing surfaces for centering the bearings (29*c*; 37*g*; 47*g*) and bearing surfaces for centering in the central bore (29*b*; 37*j*).

3. Motor according to claim 2, wherein the bearing surfaces for centering in the central bore comprises shoulders and/or wherein the central bore comprises a shouldered bearing surface.

4. Motor according to claim 1, wherein the support parts are sleeves (29) having the sole function of centering the bearings relative to the central bores, the sleeves being locked by a casing (27) covering end winding (13) of the stator.

5. Motor according to claim 1, wherein the support parts are casings (37; 47) covering end winding (13) of the stator, the casings comprising a tubular extension (37*e*; 47*e*) of an inner web (37*c*, 47*c*).

6. Motor according to claim 5, wherein the inner web (47*c*) is connected to the rest of the casing via an articulation (37*h*, 47*h*, 47*i*).

7. Motor according to claim 4, wherein a distance from the center of the bearing to the stator is less than the distance from the center of the bearing to a radial web (27*d*; 37*d*; 47*d*) of the casing.

8. Motor according to claim 1, wherein the rotor comprises a stack of metal laminations, wherein each end of the stack of metal laminations of the rotor includes a portion (24*d*; 34*d*) of reduced diameter.

9. Motor according to claim 1, wherein the radius (R4) of a portion of bearing facing the rotor is at least greater than the radius (R1, R2, R3) of a short-circuiting ring of the rotor.

10. Motor according to claim 1, wherein a universal joint (50) is place on a shaft of the rotor, the bearing (36) being placed between the rotor and the universal joint, and wherein there is a first clearance (Z3) between the rotor and the bearing and a second clearance (Z4) between the universal joint and the bearing, the first clearance being less than 2 mm and the second clearance being less than 2 mm.

11. Motor according to claim 1, wherein the length of the stack of metal laminations forming the stator is greater than the length of the stack of metal laminations forming the rotor.

* * * * *